US009108196B1

(12) United States Patent
Javadi et al.

(10) Patent No.: US 9,108,196 B1
(45) Date of Patent: Aug. 18, 2015

(54) METHOD AND APPARATUS FOR CONTROL OF FLUID FLOW OR FLUID SUSPENDED PARTICLE FLOW IN A MICROFLUIDIC CHANNEL (71) Applicant: Stratedigm Inc., San Jose, CA (US)

(72) Inventors: Shervin Javadi, Monte Sereno, CA (US); Arjuna Ragunath Karunaratne, Fremont, CA (US)

(73) Assignee: Stratedigm, Inc., San Jose, CA (US)

(*) Notice: Subject to any disclaimer, the term of this patent is extended or adjusted under 35 U.S.C. 154(b) by 218 days.

(21) Appl. No.: 13/749,660

(22) Filed: Jan. 24, 2013

Related U.S. Application Data (60) Provisional application No. 61/632,386, filed on Jan. 24, 2012.

(51) Int. Cl.
*F16K 1/02* (2006.01)
*B01L 3/00* (2006.01)

(52) U.S. Cl.
CPC .............................. *B01L 3/502738* (2013.01)

(58) Field of Classification Search
CPC ................................................ B01L 3/502738
USPC .................. 137/828, 827, 825, 862, 870, 883
See application file for complete search history.

(56) References Cited

U.S. PATENT DOCUMENTS

| 5,065,794 | A | * | 11/1991 | Cheung | 137/883 |
| 5,700,692 | A | | 12/1997 | Sweet | |
| 6,024,123 | A | * | 2/2000 | Weissfloch et al. | 137/599.08 |
| 6,102,530 | A | * | 8/2000 | Kim et al. | 347/65 |
| 6,281,018 | B1 | | 8/2001 | Kirouac | |
| 6,769,444 | B2 | | 8/2004 | Guzman | |
| 6,877,528 | B2 | * | 4/2005 | Gilbert et al. | 137/827 |
| 6,976,590 | B2 | * | 12/2005 | Deshpande et al. | 209/631 |
| 7,069,943 | B2 | * | 7/2006 | Gilbert et al. | 137/14 |
| 7,157,274 | B2 | * | 1/2007 | Bohm et al. | 435/325 |
| 7,261,144 | B2 | * | 8/2007 | Thome et al. | 165/104.29 |
| 7,569,788 | B2 | * | 8/2009 | Deshpande et al. | 209/576 |
| 7,584,857 | B2 | * | 9/2009 | Bohm et al. | 209/155 |
| 7,963,399 | B2 | * | 6/2011 | Bohm et al. | 209/552 |
| 8,136,553 | B2 | * | 3/2012 | Baroud et al. | 137/828 |
| 8,206,994 | B2 | * | 6/2012 | Baroud et al. | 436/180 |
| 8,426,209 | B2 | * | 4/2013 | Butler et al. | 436/63 |

(Continued)

OTHER PUBLICATIONS

Aoqun Jian et al., Laser-Actuated Micro-Valves and Micro-Pumps, 16th International Solid-State Sensors, Actuators and Microsystems Conference (Transducers), Jun. 5-9, 2011, Beijing, China, IEEE Conference Publications, pp. 314-317.

(Continued)

*Primary Examiner* — Craig Schneider
*Assistant Examiner* — Umashankar Venkatesan
(74) *Attorney, Agent, or Firm* — Kilpatrick Townsend & Stockton LLP (57) ABSTRACT

Fluid is flowed into an inlet channel of a microfluidic pathway at a flow rate, the microfluidic pathway including a first and second outlet channels fluidically connected to the inlet channel. A first cavitation bubble is created within the first outlet channel to block fluid flow out of the first outlet channel. A second cavitation bubble is created within the second outlet channel to block fluid flow out of the second outlet channel. Creation of the second cavitation bubble is initiated during or after the first cavitation bubble dissolves such that the flow rate is maintained.

97 Claims, 4 Drawing Sheets

(56) References Cited

U.S. PATENT DOCUMENTS

| | | |
|---|---|---|
| 8,502,148 B2 * | 8/2013 | Wagner et al. .............. 250/338.1 |
| 8,623,295 B2 * | 1/2014 | Gilbert et al. ................. 422/503 |
| 2003/0150716 A1 * | 8/2003 | Hua et al. ...................... 204/232 |
| 2003/0170609 A1 * | 9/2003 | Rigler ............................... 435/4 |
| 2005/0249636 A1 * | 11/2005 | Tacklind et al. ................ 422/73 |
| 2008/0213821 A1 | 9/2008 | Liu |
| 2008/0261295 A1 | 10/2008 | Butler |
| 2009/0000665 A1 * | 1/2009 | Oshemkov et al. ............. 137/13 |
| 2011/0005978 A1 * | 1/2011 | Bohm et al. ................... 209/155 |
| 2011/0030808 A1 | 2/2011 | Chiou |

OTHER PUBLICATIONS

Christodoulides, Demetrios N. et al., "Nonlinear refraction and absorption: mechanisms and magnitudes," Advances in Optics and Photonics, Jan. 26, 2010, vol. 2, issue 1, pp. 60-200.

Evans, R. et al., "Pump-probe imaging of nanosecond laser-induced bubbles in agar gel," Optics Express, May 12, 2008, vol. 16, No. 10, pp. 7481-7492.

Tiwari, Dhirendra et al. "Dynamical Observation of Femtosecond-Laser-Induced Bubbles in Water Using a Single Laser Source for Probing and Sensing," Applied Physics Express, Dec. 2010, vol. 3, No. 12, pp. 127101-1 to 127101-3.

* cited by examiner

METHOD AND APPARATUS FOR CONTROL OF FLUID FLOW OR FLUID SUSPENDED PARTICLE FLOW IN A MICROFLUIDIC CHANNEL

CROSS-REFERENCES TO RELATED APPLICATIONS

This application claims the benefit of U.S. provisional application No. 61/632,386, filed Jan. 24, 2012, the entirety of which is incorporated by reference herein.

BACKGROUND OF THE INVENTION

Microfluidic channels and the control of fluid and/or fluid suspended particle flow within them are useful in many applications. Drug discovery and diagnosis of disease, for example may require the control of movement of reagents and biological samples to and from chambers where reactions may take place. Sorting of cells for example may require cells arriving from one or more sources to be sent to one or more destinations. Such sorting may require a high speed valves to redirect the flow of fluid and particles dynamically based on analysis of the type of cells or particles arriving, on a cell by cell or particle by particle basis.

One method to affect fluid flow within a channel is to create a vapor bubble within the channel, or adjacent to the channel so as to affect the flow within the channel. Small 10-100 µm vapor bubbles can be created within 1-100 µS of turning on a laser and they will also re-condense into liquid in approximately the same time frame when the laser is turned off.

It was disclosed by Jian et al., LASER-ACTUATED MICRO-VALVES AND MICRO-PUMPS, 16th International Solid-State Sensors, Actuators and Microsystems Conference, Jun. 5-9, 2011, that vapor bubbles have been created by the heating effect of a laser light being absorbed by a gold target on the channel wall. U.S. Pub. No. 2011/0030808, disclosed that vapor bubbles have been created in cavities adjacent to a channel with electrometric walls so as to deflect the walls and create changes in the fluid flow within the channel. U.S. Pub. No. 2008/0261295 disclosed that lasers are used to trap particles by surrounding them with light, but not through vapor bubble creation.

The prior art, e.g., U.S. Pub. No. 2011/0030808, has several shortcomings; first in an application where cells or particles within the fluid are sorted into one of two paths for example, even though particles may be selectively deflected to enter one or the other channel, fluid flow is present in both paths at all times, thus the sample fluid containing the particles of interest is continuously diluted. This type of dilution is not present in "Sort in air" systems (e.g., U.S. Pat. No. 6,281,018 and U.S. Pat. No. 5,700,692), where only the sample of interest is sent into the collection chamber. A further shortcoming of U.S. Pub. No. 2011/0030808 is that it requires the construction of flexible flow channels of an electrometric substance, where as a glass or quartz cuvette would be more durable.

The prior art (e.g., Jian et al.) also has shortcomings in that it requires an opaque target to be deposited on one side of the flow channel walls, further because heat is absorbed by the walls and then transferred to the fluid, the action is very slow in the several millisecond regime.

BRIEF SUMMARY OF THE INVENTION

In many embodiments, a fluidic switch is created within a microfluidic pathway having one or more inlets, and one or more outlets, with fluid flow within one or more channels being substantially blocked or allowed by the presence or absence of a vapor bubble. The vapor bubble spatial position and time of creation are changed by optical switches or spatial light modulators, or controlling of laser emission.

In many embodiments, vapor bubbles are created in a medium by non-linear means, including but not limited to, multiple photon absorption due to the high power density (greater than 1 MW/cm squared) of the focused light. The medium would not normally absorb a significant fraction of the light (less than 10% absorption).

In many embodiments, the light of the laser is in the far ultraviolet or far infrared portions of the spectrum, where significant absorption of the light will occur within the dimensions of the channel cross section, by virtue of the light absorption coefficient of the fluid being several orders of magnitude greater at these frequencies than in the visible spectrum.

In many embodiments, the resistance to flow is maintained at a constant value, by way of allowing a bubble to re-condense in one channel while creating a new bubble in a different channel, or even at a different point in the same channel.

In many embodiments, fluid is flowed through a microfluidic pathway and a cavitation bubble is created using an optical element within the pathway to block fluid flow within the fluidic pathway.

In many embodiments, a system includes a microfluidic pathway for flowing a fluid, a laser source, and an optical element adapted to receive energy from the laser source and direct the energy to the fluid within microfluidic pathway. The optical element delivers energy to the fluid at a power density greater than 1 MW/cm$^2$ to create a cavitation bubble within the microfluidic pathway and thereby block flow of the fluid.

In many embodiments, a system includes a microfluidic pathway for flowing a fluid, a deep ultraviolet or deep infrared laser source, and an optical element adapted to receive energy from the laser source and direct the energy to the fluid within microfluidic pathway. The optical element delivers energy to the fluid at a power density to create a cavitation bubble within the microfluidic pathway and thereby block flow of the fluid.

In many embodiments, a fluid is flowed into an inlet channel of a microfluidic pathway at a constant flow rate, the microfluidic pathway including a first and second outlet channels fluidically connected to the inlet channel. A first cavitation bubble is created within the first outlet channel to block fluid flow out of the first outlet channel. A second cavitation bubble is created within the second outlet channel to block fluid flow out of the second outlet channel. Creation of the second cavitation bubble is initiated during or after the first cavitation bubble dissolves such that the constant flow rate is maintained.

In many embodiments, a system includes a microfluidic pathway for flowing a fluid. The microfluidic pathway includes an inlet channel and first and second outlet channels fluidically connected to the inlet channel. The system also includes a laser source and an optical element adapted to receive energy from the laser source and direct the energy to the fluid within the first and second outlet channels. The system also includes a controller adapted to use the laser source and optical element to perform a method in which a fluid is flowed into an inlet channel of a microfluidic pathway at a constant flow rate, the microfluidic pathway including a first and second outlet channels fluidically connected to the inlet channel. A first cavitation bubble is created within the first outlet channel to block fluid flow out of the first outlet channel. A second cavitation bubble is created within the second outlet channel to block fluid flow out of the second outlet channel. Creation of the second cavitation bubble is initiated during or after the first cavitation bubble dissolves such that the constant flow rate is maintained.

In many embodiments, the cavitation bubble is 1-100 μm in diameter.

In many embodiments, the power density is greater than 1 MW/cm$^2$.

In many embodiments, the microfluidic pathway about the cavitation bubble is rigid.

In many embodiments, a laser source is directed at the optical element to create the fluidic switch.

In many embodiments, the optical element delivers energy to the fluid at a power density greater than 1 MW/cm2.

In many embodiments, the laser source delivers deep ultraviolet or deep infrared energy.

In many embodiments, the fluid flow is halted by the fluidic switch.

In many embodiments, the optical element comprises a spatial holographic light modulator, a diffractive or reflective MEMS based module, an acousto-optic light deflector.

In many embodiments, the fluid absorbs less than 10% energy from incident light.

In many embodiments, the fluid does not include any doping additives to alter energy absorption.

In many embodiments, blockage of the flow is maintained by allowing the cavitation bubble to re-condense while creating a new cavitation bubble at a different location within the fluid.

In many embodiments, blocking the fluid flow in the first outlet channel is reestablished by allowing the second cavitation bubble to re-condense while creating a new cavitation bubble in the first outlet channel at a different location than where the first cavitation bubble was created

DETAILED DESCRIPTION OF THE INVENTION

Figure 1:
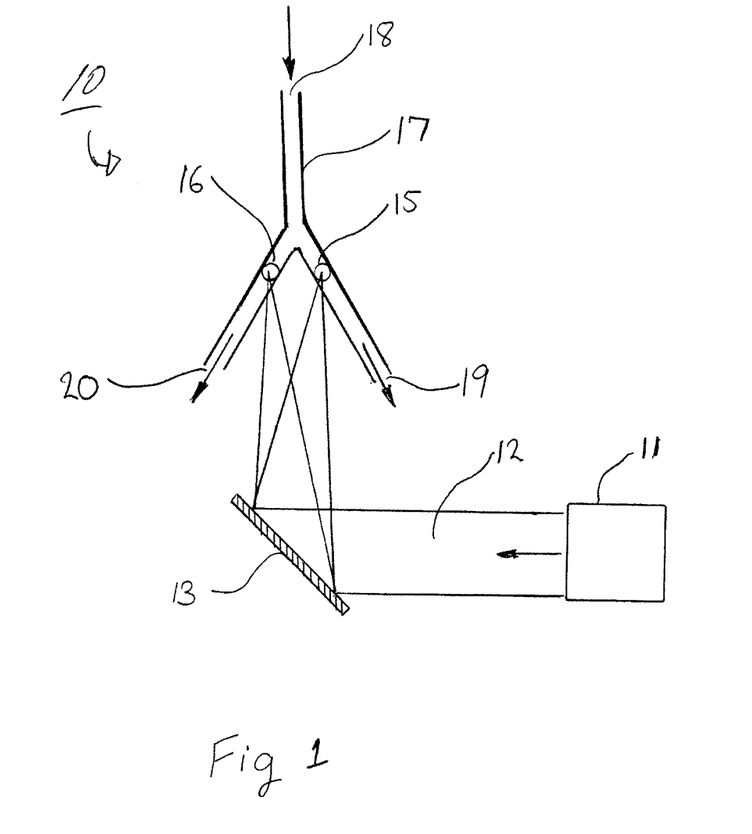
FIG. 1 is a system diagram, according to many embodiments.

FIG. 1 shows a microfluidic pathway 10, depicted as an inverted Y where fluid enters from the top 18 and is sent in to one of the two paths 19 or 20 of the inverted Y as desired. A laser source 11 emitting laser beam 12 creates microfluidic switches (cavitation/vapor bubbles 15, 16) at one or the other branch of the Y by means of the optical element 13 so as to switch the flow of fluid to the branch that is not blocked. The laser source 11 can be any suitable laser type, such as a q-switching or cw diode laser, or a plurality of such lasers commonly focused. The laser source can include a control system, such as a general purpose or specific purpose computer, which is configured to operate the laser source 11, optical element 13, as well as flow controls (e.g., pumps, gates) for the microfluidic pathway 10.

The microfluidic pathway according to known methodologies, such as disclosed in the references noted above, and in U.S. Pat. No. 6,769,444, which is incorporated by reference. For example, the microfluidic pathway 10 can be constructed from an etched substrate that is located between an upper substrate and lower substrate. Alternatively, the microfluidic pathway can be constructed from micro-tubing. Generally, the microfluidic pathway 10 will include a suitably transparent portion for passing laser light, or other energy. The microfluidic pathway 10 can be interconnected with various chambers and additional pathways. The internal width and height of the microfluidic pathway 10 can be substantially equal or unequal. In some embodiments, at least one of the width and height is approximately 50 μm, and can range from 5-200 μm. Although flexible membrane passages can be used to define at least a portion of the microfluidic pathway 10, as is known in the art, the entire bounds of the microfluidic pathway 10, at the point where the vapor bubble is created, can be constructed from a substantially rigid (e.g., glass, crystal, hard polymer) material, such as a glass or quartz cuvette.

The optical element 13 is actuated typically in less than 1 mS, preferably in 10 μS, in response to typically, but not restricted to, an electrical pulse, so as to switch the spatial destination of the laser beam within the microfluidic pathway 10. Accordingly, resistance to flow is maintainable creating new bubbles at different locations within the microfluidic pathway 10, as prior bubbles dissolve back into the fluid. For example, a first cavitation bubble can be created at a first location within the microfluidic pathway 10 to block fluid flow (substantially or completely). Over time, the first cavitation bubble will dissolve and flow will be restored. When this occurs, or before this occurs, a second cavitation bubble can be created at a second location within the microfluidic pathway 10 to continually block fluid flow. It follows that this process can be repeated as needed over a greater time period. Further, a predetermined time period can occur between dissolving the first cavitation bubble and creation of the second cavitation bubble, such that the fluid moves in pulses according to the length of the predetermined time period.

Particles of interest can be located between the first and second bubbles to gate movement of the particles. For example, the first bubble 16 can be created in outlet channel 20 of a Y channel, and the second bubble 15 can be created in a second outlet channel 19 of the Y channel. Alternating the creation of the first and second bubbles 15/16 causes fluid and particles of interest to flow into the channel in which a bubble is not present. For example, the second bubble 15 can be initiated at a particular time period (e.g., 3-20 μS) after the first bubble 16 is initiated. The particular time period can be such that the second bubble 15 is formed while the first bubble 16 is collapsing back into fluid, or immediately thereafter. In this manner, particles of interest can be routed to specific portions of the microfluidic pathway 10 while maintaining (i.e., not allowing the flow rate to drop below predetermined level) the flow rate into the inlet channel 17. The controller can be configured to operate the laser source and optical element to perform such a method. The outlet channels 20/19 can be routed to a device for further analysis, such as a flow cytometer.

The optical element may be constructed of, but not limited to a single element such as a spatial holographic light modulator, a diffractive or reflective MEMS based module, an acousto-optic light deflector, or may be composed of multiple of such devices or fast shutters. The optical element 13 can be computer controlled and actuated by one or more servo motors to move the focusing point of the optical element 13.

Figure 4:
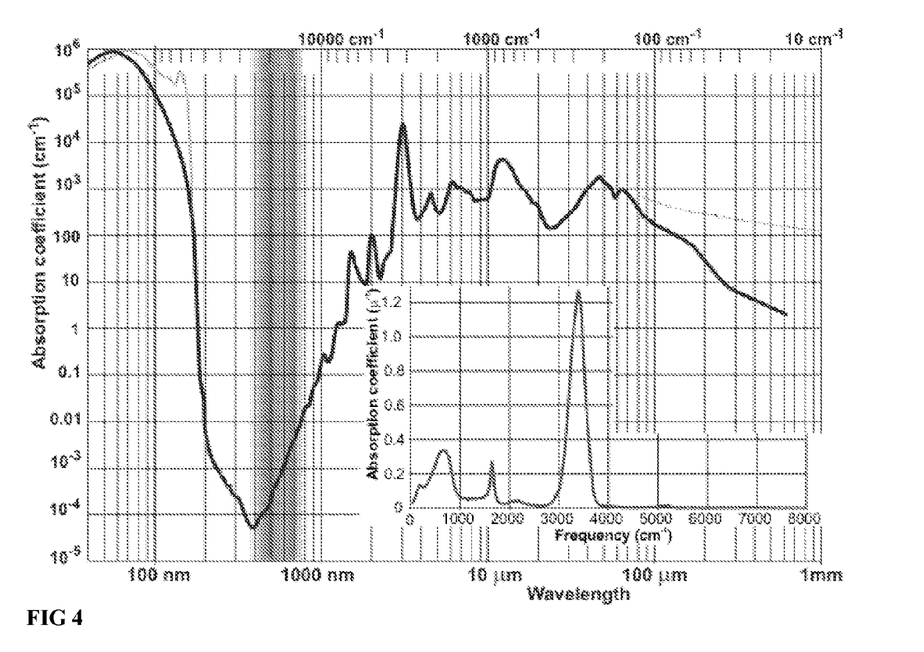
FIG. 4 is a drawing of the light absorption spectrum of water.

In many embodiments, the channel, which is typically only 50 μm wide, is filled with a transparent fluid, predominantly consisting of water. Water, or solutions of predominantly water, absorb less than 10% of the incident light, in the visible or near visible wavelengths, over a distance of 50 μm as shown in FIG. 4. Cavitation will not occur or will only occur with difficulty since the laser radiation is not absorbed. U.S. Pub. No. 2011/0030808 mitigates this problem by having an adjacent channel where a fluid with a dye or particles which absorb the laser radiation flows in parallel with the stream to be deflected, the laser being focused on the adjacent channel. Jian et al. mitigates the absorption problem by providing a sputtered gold target on the walls of the channel, the laser being focused on the gold target. It should be understood that embodiments disclosed herein may operate without such targets or other doping additives to modify absorption of the fluid.

Thus, fluid may be transparent to the laser light, for example greater than 90% transmission in a 50 μm wide pathway, but yet cavitation can occur since the laser is focused to a point within the flow of fluid such that the energy density of the laser photon flux is greater than about 1 MW/cm-squared, preferably 10 MW/cm-squared. At such a density of photon flux, non-linear effects such as multi photon absorption by a single electron of a fluid atom, can lead to the creation of plasma, which then increases the absorption coefficient beyond what would be measured at low photon flux densities. The energy thus absorbed causes a cavitation bubble of size around 1-100 μm in diameter (e.g., large enough to completely fill the pathway of a microfluidic channel) to appear over a timer period of about 10 μS (e.g., 3-20 μS). Due to the high energy density, the cavitation bubble is a mixture of plasma and of the gaseous phase of the liquid.

Figure 2:
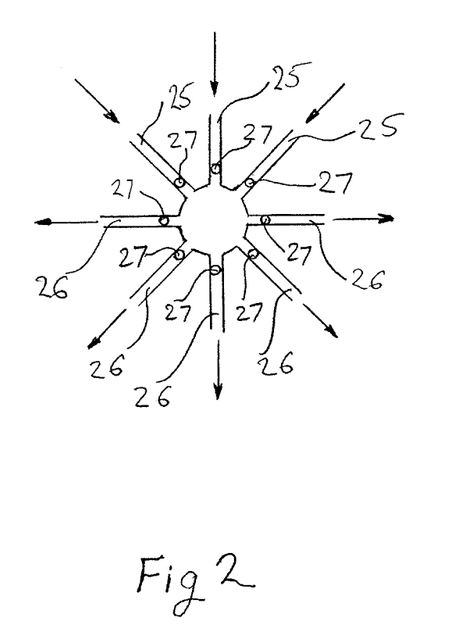
FIG. 2 is a diagram of a microfluidic switch, according to many embodiments.
Figure 3:
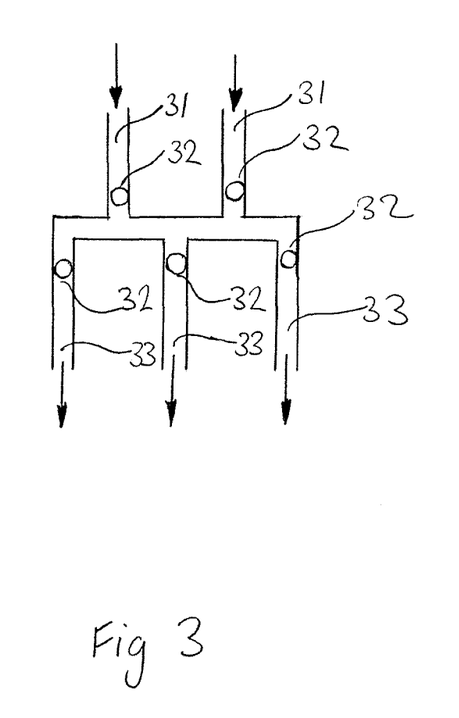
FIG. 3 is a diagram of a microfluidic switch, according to many embodiments.

More complex fluid flow architectures are possible and are shown by way of example only in FIG. 2 and FIG. 3. In FIG. 2, a plurality of inlet channels 25 and outlet channels 26 may selectively block access to a central chamber by the creating one or more vapor bubbles 27. Blocking of the outlet channels 26 can occur in the manner described above, i.e., in an alternating fashion such that flow inlet is maintained into the inlet channels 25. In FIG. 3, a plurality of inlet channels 31 and outlet channels 33 may be selectively blocked by the presence of one or more vapor bubbles 32. Blocking of the outlet channels 33 can occur in the manner described above, i.e., in an alternating fashion such that flow inlet is maintained into the inlet channels 33.

A particular wavelength of laser may be used such that the fluid itself absorbs a significant fraction, for example greater than 50% absorption of the incident light in a distance of 50 μm. In FIG. 4 it is shown in the both charts (logarithmic and standard) that water has a very high absorption coefficient (approaching $10^6$ cm$^{-1}$) for deep ultraviolet energy (e.g., 10-100 nm, although greater or narrower ranges can be used depending on available lasers) in a 50 μm wide channel. In FIG. 4 it is shown in the greater chart that water has a very high absorption coefficient (between $10^4$-$10^5$ cm$^{-1}$) for deep infrared energy (900-3000 nm, although greater or narrower ranges can be used depending on available lasers). Thus, energy sources, such as lasers, providing such types of energy can deliver energy at a substantially lower density to create cavitation bubbles in water.

All patents, patent applications, and other publications cited in this application are incorporated by reference in the entirety.

Although the above description contains many specificities, these should not be construed as limitations on the scope of the invention, but merely as illustrations of some of the presently preferred embodiments. Many possible variations and modifications to the invention will be apparent to one skilled in the art upon consideration of this disclosure.

What is claimed is:

1. A method comprising:
   flowing a fluid into at least one inlet channel of a microfluidic pathway at a flow rate, the microfluidic pathway comprising at least a first and second outlet channels fluidically connected to the inlet channel;
   creating a first cavitation bubble within the first outlet channel to block fluid flow out of the first outlet channel; and
   creating a second cavitation bubble within the second outlet channel to block fluid flow out of the second outlet channel, wherein creation of the second cavitation bubble is initiated during or after recondensation of the first cavitation bubble such that the flow rate is maintained,
   wherein an optical power density required to create the first and second cavitation bubbles is of a magnitude that is required for multi-photon absorption by a single electron.

2. The method of claim 1, wherein the cavitation bubble is 1-100 μm in diameter.

3. The method of claim 1, wherein the microfluidic pathway about the cavitation bubble is rigid.

4. The method of claim 1, wherein a laser source is directed at an optical element to create the first and second cavitation bubbles.

5. The method of claim 4, wherein the laser source delivers deep ultraviolet or deep infrared energy.

6. The method of claim 4, wherein the optical element comprises a spatial holographic light modulator, a diffractive or reflective MEMS based module, or an acousto-optic light deflector.

7. The method of claim 1, wherein the fluid absorbs less than 10% energy from incident light when excited at a low power density and the fluid absorbs more than 10% when excited at a high power density.

8. The method of claim 7, wherein the fluid does not include any doping additives to alter energy absorption.

9. The method of claim 1, wherein blocking of the fluid flow in the first outlet channel is reestablished by allowing the second cavitation bubble to re-condense while creating a new cavitation bubble in the first outlet channel at a different location than where the first cavitation bubble was created.

10. A system comprising:
    a microfluidic pathway for flowing a fluid, the microfluidic pathway comprising at least one inlet channel and at least a first and second outlet channels fluidically connected to the inlet channel;
    at least one laser source;
    at least one optical element adapted to receive energy from the laser source and direct the energy to the fluid within the first and second outlet channels; and
    a controller adapted to control the at least one laser source and at least one optical element to create a first cavitation bubble within the first outlet channel to block fluid flow out of the first outlet channel and create a second cavitation bubble within the second outlet channel to block fluid flow out of the second outlet channel, wherein creation of the second cavitation bubble is initiated during or after recondensation of the first cavitation bubble such that flow rate is maintained into the inlet channel and out of the first and second outlet channels,
    wherein an optical power density required to create the first and second cavitation bubbles is of a magnitude that is required for multi-photon absorption by a single electron.

11. The system of claim 10, wherein the cavitation bubble is 1-100 µm in diameter.

12. The system of claim 10, wherein the microfluidic pathway about the cavitation bubble is rigid.

13. The system of claim 10, wherein the laser source comprises a plurality of lasers.

14. The system of claim 10, wherein the laser source delivers deep ultraviolet or deep infrared energy.

15. The system of claim 10, wherein the optical element comprises a spatial holographic light modulator, a diffractive or reflective MEMS based module, or an acousto-optic light deflector.

16. The system of claim 10, wherein the fluid absorbs less than 10% energy from the optical element when exited at a low power density and the fluid absorbs more than 10% when excited at a high power density.

17. The system of claim 16, wherein the fluid does not include any doping additives to alter energy absorption.

18. The system of claim 10, wherein blocking of the fluid flow in the first outlet channel is reestablished by allowing the second cavitation bubble to re-condense while creating a new cavitation bubble in the first outlet channel at a different location than where the first cavitation bubble was created.

19. A method comprising:
flowing a fluid into at least one inlet channel of a microfluidic pathway at a flow rate, the microfluidic pathway comprising at least a first and second outlet channels fluidically connected to the inlet channel;
creating a first cavitation bubble within the first outlet channel to block fluid flow out of the first outlet channel; and
creating a second cavitation bubble within the second outlet channel to block fluid flow out of the second outlet channel, wherein creation of the second cavitation bubble is initiated during or after recondensation of the first cavitation bubble such that the flow rate is maintained,
wherein a laser source is directed at an optical element to create the first and second cavitation bubbles, wherein the laser source delivers deep ultraviolet or deep infrared energy.

20. The method of claim 19, wherein the cavitation bubble is 1-100 µm in diameter.

21. The method of claim 19, wherein an optical power density required to create the first and second cavitation bubbles is of a magnitude that is required for multi-photon absorption by a single electron.

22. The method of claim 19, wherein the microfluidic pathway about the cavitation bubble is rigid.

23. The method of claim 19, wherein the optical element comprises a spatial holographic light modulator, a diffractive or reflective MEMS based module, or an acousto-optic light deflector.

24. The method of claim 19, wherein the fluid absorbs less than 10% energy from incident light when excited at a low power density and the fluid absorbs more than 10% when excited at a high power density.

25. The method of claim 24, wherein the fluid does not include any doping additives to alter energy absorption.

26. The method of claim 19, wherein blocking of the fluid flow in the first outlet channel is reestablished by allowing the second cavitation bubble to re-condense while creating a new cavitation bubble in the first outlet channel at a different location than where the first cavitation bubble was created.

27. A method comprising:
flowing a fluid into at least one inlet channel of a microfluidic pathway at a flow rate, the microfluidic pathway comprising at least a first and second outlet channels fluidically connected to the inlet channel;
creating a first cavitation bubble within the first outlet channel to block fluid flow out of the first outlet channel; and
creating a second cavitation bubble within the second outlet channel to block fluid flow out of the second outlet channel, wherein creation of the second cavitation bubble is initiated during or after recondensation of the first cavitation bubble such that the flow rate is maintained,
wherein a laser source is directed at an optical element to create the first and second cavitation bubbles, wherein the optical element comprises a spatial holographic light modulator, a diffractive or reflective MEMS based module, or an acousto-optic light deflector.

28. The method of claim 27, wherein the cavitation bubble is 1-100 µm in diameter.

29. The method of claim 27, wherein an optical power density required to create the first and second cavitation bubbles is of a magnitude that is required for multi-photon absorption by a single electron.

30. The method of claim 27, wherein the microfluidic pathway about the cavitation bubble is rigid.

31. The method of claim 27, wherein the laser source delivers deep ultraviolet or deep infrared energy.

32. The method of claim 27, wherein the fluid absorbs less than 10% energy from incident light when excited at a low power density and the fluid absorbs more than 10% when excited at a high power density.

33. The method of claim 32, wherein the fluid does not include any doping additives to alter energy absorption.

34. The method of claim 27, wherein blocking of the fluid flow in the first outlet channel is reestablished by allowing the second cavitation bubble to re-condense while creating a new cavitation bubble in the first outlet channel at a different location than where the first cavitation bubble was created.

35. A method comprising:
flowing a fluid into at least one inlet channel of a microfluidic pathway at a flow rate, the microfluidic pathway comprising at least a first and second outlet channels fluidically connected to the inlet channel;
creating a first cavitation bubble within the first outlet channel to block fluid flow out of the first outlet channel; and
creating a second cavitation bubble within the second outlet channel to block fluid flow out of the second outlet channel, wherein creation of the second cavitation bubble is initiated during or after recondensation of the first cavitation bubble such that the flow rate is maintained,
wherein the fluid absorbs less than 10% energy from incident light when excited at a low power density and the fluid absorbs more than 10% when excited at a high power density.

36. The method of claim 35, wherein the cavitation bubble is 1-100 µm in diameter.

37. The method of claim 35, wherein an optical power density required to create the first and second cavitation bubbles is of a magnitude that is required for multi-photon absorption by a single electron.

38. The method of claim 35, wherein the microfluidic pathway about the cavitation bubble is rigid.

39. The method of claim 35, wherein a laser source is directed at an optical element to create the first and second cavitation bubbles.

40. The method of claim 39, wherein the laser source delivers deep ultraviolet or deep infrared energy.

41. The method of claim 39, wherein the optical element comprises a spatial holographic light modulator, a diffractive or reflective MEMS based module, or an acousto-optic light deflector.

42. The method of claim 35, wherein the fluid does not include any doping additives to alter energy absorption.

43. The method of claim 35, wherein blocking of the fluid flow in the first outlet channel is reestablished by allowing the second cavitation bubble to re-condense while creating a new cavitation bubble in the first outlet channel at a different location than where the first cavitation bubble was created.

44. A method comprising:
   flowing a fluid into at least one inlet channel of a microfluidic pathway at a flow rate, the microfluidic pathway comprising at least a first and second outlet channels fluidically connected to the inlet channel;
   creating a first cavitation bubble within the first outlet channel to block fluid flow out of the first outlet channel; and
   creating a second cavitation bubble within the second outlet channel to block fluid flow out of the second outlet channel, wherein creation of the second cavitation bubble is initiated during or after recondensation of the first cavitation bubble such that the flow rate is maintained,
   wherein blocking of the fluid flow in the first outlet channel is reestablished by allowing the second cavitation bubble to re-condense while creating a new cavitation bubble in the first outlet channel at a different location than where the first cavitation bubble was created.

45. The method of claim 44, wherein the cavitation bubble is 1-100 µm in diameter.

46. The method of claim 44, wherein an optical power density required to create the first and second cavitation bubbles is of a magnitude that is required for multi-photon absorption by a single electron.

47. The method of claim 44, wherein the microfluidic pathway about the cavitation bubble is rigid.

48. The method of claim 44, wherein a laser source is directed at an optical element to create the first and second cavitation bubbles.

49. The method of claim 48, wherein the laser source delivers deep ultraviolet or deep infrared energy.

50. The method of claim 48, wherein the optical element comprises a spatial holographic light modulator, a diffractive or reflective MEMS based module, or an acousto-optic light deflector.

51. The method of claim 44, wherein the fluid absorbs less than 10% energy from incident light when excited at a low power density and the fluid absorbs more than 10% when excited at a high power density.

52. The method of claim 51, wherein the fluid does not include any doping additives to alter energy absorption.

53. A system comprising:
   a microfluidic pathway for flowing a fluid, the microfluidic pathway comprising at least one inlet channel and at least a first and second outlet channels fluidically connected to the inlet channel;
   at least one laser source;
   at least one optical element adapted to receive energy from the laser source and direct the energy to the fluid within the first and second outlet channels; and
   a controller adapted to control the at least one laser source and the at least one optical element to create a first cavitation bubble within the first outlet channel to block fluid flow out of the first outlet channel and create a second cavitation bubble within the second outlet channel to block fluid flow out of the second outlet channel, wherein creation of the second cavitation bubble is initiated during or after recondensation of the first cavitation bubble such that flow rate is maintained into the inlet channel and out of the first and second outlet channels,
   wherein the laser source comprises a plurality of lasers.

54. The system of claim 53, wherein the cavitation bubble is 1-100 µm in diameter.

55. The system of claim 53, wherein an optical power density required to create the first and second cavitation bubbles is of a magnitude that is required for multi-photon absorption by a single electron.

56. The system of claim 53, wherein the microfluidic pathway about the cavitation bubble is rigid.

57. The system of claim 53, wherein the laser source delivers deep ultraviolet or deep infrared energy.

58. The system of claim 53, wherein the optical element comprises a spatial holographic light modulator, a diffractive or reflective MEMS based module, or an acousto-optic light deflector.

59. The system of claim 53, wherein the fluid absorbs less than 10% energy from the optical element when exited at a low power density and the fluid absorbs more than 10% when excited at a high power density.

60. The system of claim 59, wherein the fluid does not include any doping additives to alter energy absorption.

61. The system of claim 53, wherein blocking of the fluid flow in the first outlet channel is reestablished by allowing the second cavitation bubble to re-condense while creating a new cavitation bubble in the first outlet channel at a different location than where the first cavitation bubble was created.

62. A system comprising:
   a microfluidic pathway for flowing a fluid, the microfluidic pathway comprising at least one inlet channel and at least a first and second outlet channels fluidically connected to the inlet channel;
   at least one laser source;
   at least one optical element adapted to receive energy from the laser source and direct the energy to the fluid within the first and second outlet channels; and
   a controller adapted to control the at least one laser source and the at least one optical element to create a first cavitation bubble within the first outlet channel to block fluid flow out of the first outlet channel and create a second cavitation bubble within the second outlet channel to block fluid flow out of the second outlet channel, wherein creation of the second cavitation bubble is initiated during or after recondensation of the first cavitation bubble such that flow rate is maintained into the inlet channel and out of the first and second outlet channels,
   wherein the laser source delivers deep ultraviolet or deep infrared energy.

63. The system of claim 62, wherein the cavitation bubble is 1-100 µm in diameter.

64. The system of claim 62, wherein an optical power density required to create the first and second cavitation bubbles is of a magnitude that is required for multi-photon absorption by a single electron.

65. The system of claim 62, wherein the microfluidic pathway about the cavitation bubble is rigid.

66. The system of claim 62, wherein the laser source comprises a plurality of lasers.

67. The system of claim 62, wherein the optical element comprises a spatial holographic light modulator, a diffractive or reflective MEMS based module, or an acousto-optic light deflector.

68. The system of claim 62, wherein the fluid absorbs less than 10% energy from the optical element when exited at a low power density and the fluid absorbs more than 10% when excited at a high power density.

69. The system of claim 68, wherein the fluid does not include any doping additives to alter energy absorption.

70. The system of claim 62, wherein blocking of the fluid flow in the first outlet channel is reestablished by allowing the second cavitation bubble to re-condense while creating a new cavitation bubble in the first outlet channel at a different location than where the first cavitation bubble was created.

71. A system comprising:
a microfluidic pathway for flowing a fluid, the microfluidic pathway comprising at least one inlet channel and at least a first and second outlet channels fluidically connected to the inlet channel;
at least one laser source;
at least one optical element adapted to receive energy from the laser source and direct the energy to the fluid within the first and second outlet channels; and
a controller adapted to control the at least one laser source and the at least one optical element to create a first cavitation bubble within the first outlet channel to block fluid flow out of the first outlet channel and create a second cavitation bubble within the second outlet channel to block fluid flow out of the second outlet channel, wherein creation of the second cavitation bubble is initiated during or after recondensation of the first cavitation bubble such that flow rate is maintained into the inlet channel and out of the first and second outlet channels,
wherein the optical element comprises a spatial holographic light modulator, a diffractive or reflective MEMS based module, or an acousto-optic light deflector.

72. The system of claim 71, wherein the cavitation bubble is 1-100 µm in diameter.

73. The system of claim 71, wherein an optical power density required to create the first and second cavitation bubbles is of a magnitude that is required for multi-photon absorption by a single electron.

74. The system of claim 71, wherein the microfluidic pathway about the cavitation bubble is rigid.

75. The system of claim 71, wherein the laser source comprises a plurality of lasers.

76. The system of claim 71, wherein the laser source delivers deep ultraviolet or deep infrared energy.

77. The system of claim 71, wherein the fluid absorbs less than 10% energy from the optical element when exited at a low power density and the fluid absorbs more than 10% when excited at a high power density.

78. The system of claim 77, wherein the fluid does not include any doping additives to alter energy absorption.

79. The system of claim 71, wherein blocking of the fluid flow in the first outlet channel is reestablished by allowing the second cavitation bubble to re-condense while creating a new cavitation bubble in the first outlet channel at a different location than where the first cavitation bubble was created.

80. A system comprising:
a microfluidic pathway for flowing a fluid, the microfluidic pathway comprising at least one inlet channel and at least a first and second outlet channels fluidically connected to the inlet channel;
at least one laser source;
at least one optical element adapted to receive energy from the laser source and direct the energy to the fluid within the first and second outlet channels; and
a controller adapted to control the at least one laser source and the at least one optical element to create a first cavitation bubble within the first outlet channel to block fluid flow out of the first outlet channel and create a second cavitation bubble within the second outlet channel to block fluid flow out of the second outlet channel, wherein creation of the second cavitation bubble is initiated during or after recondensation of the first cavitation bubble such that flow rate is maintained into the inlet channel and out of the first and second outlet channels,
wherein the fluid absorbs less than 10% energy from the optical element when exited at a low power density and the fluid absorbs more than 10% when excited at a high power density.

81. The system of claim 80, wherein the cavitation bubble is 1-100 µm in diameter.

82. The system of claim 80, wherein an optical power density required to create the first and second cavitation bubbles is of a magnitude that is required for multi-photon absorption by a single electron.

83. The system of claim 80, wherein the microfluidic pathway about the cavitation bubble is rigid.

84. The system of claim 80, wherein the laser source comprises a plurality of lasers.

85. The system of claim 80, wherein the laser source delivers deep ultraviolet or deep infrared energy.

86. The system of claim 80, wherein the optical element comprises a spatial holographic light modulator, a diffractive or reflective MEMS based module, or an acousto-optic light deflector.

87. The system of claim 80, wherein the fluid does not include any doping additives to alter energy absorption.

88. The system of claim 80, wherein blocking of the fluid flow in the first outlet channel is reestablished by allowing the second cavitation bubble to re-condense while creating a new cavitation bubble in the first outlet channel at a different location than where the first cavitation bubble was created.

89. A system comprising:
a microfluidic pathway for flowing a fluid, the microfluidic pathway comprising at least one inlet channel and at least a first and second outlet channels fluidically connected to the inlet channel;
at least one laser source;
at least one optical element adapted to receive energy from the laser source and direct the energy to the fluid within the first and second outlet channels; and
a controller adapted to control the at least one laser source and the at least one optical element to create a first cavitation bubble within the first outlet channel to block fluid flow out of the first outlet channel and create a second cavitation bubble within the second outlet channel to block fluid flow out of the second outlet channel, wherein creation of the second cavitation bubble is initiated during or after recondensation of the first cavitation bubble such that flow rate is maintained into the inlet channel and out of the first and second outlet channels,
wherein blocking of the fluid flow in the first outlet channel is reestablished by allowing the second cavitation bubble to re-condense while creating a new cavitation bubble in the first outlet channel at a different location than where the first cavitation bubble was created.

90. The system of claim 89, wherein the cavitation bubble is 1-100 μm in diameter.

91. The system of claim 89, wherein an optical power density required to create the first and second cavitation bubbles is of a magnitude that is required for multi-photon absorption by a single electron.

92. The system of claim 89, wherein the microfluidic pathway about the cavitation bubble is rigid.

93. The system of claim 89, wherein the laser source comprises a plurality of lasers.

94. The system of claim 89, wherein the laser source delivers deep ultraviolet or deep infrared energy.

95. The system of claim 89, wherein the optical element comprises a spatial holographic light modulator, a diffractive or reflective MEMS based module, or an acousto-optic light deflector.

96. The system of claim 89, wherein the fluid absorbs less than 10% energy from the optical element when exited at a low power density and the fluid absorbs more than 10% when excited at a high power density.

97. The system of claim 96, wherein the fluid does not include any doping additives to alter energy absorption.

\* \* \* \* \*